United States Patent [19]

Okamura et al.

[11] Patent Number: 4,585,187
[45] Date of Patent: Apr. 29, 1986

[54] MAGNETIC TAPE CASSETTE

[75] Inventors: Masatoshi Okamura; Haruo Shiba; Kenji Hashizume; Yoshiya Sakata, all of Saku, Japan

[73] Assignee: TDK Corporation, Tokyo, Japan

[21] Appl. No.: 691,891

[22] Filed: Jan. 16, 1985

[30] Foreign Application Priority Data

Jan. 18, 1984 [JP] Japan .................. 59-4205[U]

[51] Int. Cl.$^4$ .................. G03B 1/04; G11B 15/32
[52] U.S. Cl. .................. 242/198
[58] Field of Search .................. 242/192, 197-200, 242/204; 360/96, 132; 400/207, 208, 208.1, 234

[56] References Cited

U.S. PATENT DOCUMENTS

| | | | |
|---|---|---|---|
| 2,943,805 | 7/1960 | Loewe | 242/198 |
| 3,059,871 | 10/1962 | Loewe | 242/198 |
| 4,050,087 | 9/1977 | Kishi | 360/96 |
| 4,288,048 | 9/1981 | Sieben | 242/198 |
| 4,473,202 | 9/1984 | Verhoeven | 242/198 |
| 4,513,929 | 4/1985 | Oishi | 242/198 |

Primary Examiner—Stanley N. Gilreath
Attorney, Agent, or Firm—Oblon, Fisher, Spivak, McClelland & Maier

[57] ABSTRACT

A magnetic tape cassette comprises a locking means which is slidable between a locking position of engagement with a pair of reels held in the magnetic tape cassette and a releasing position of disengagement from the reels. The locking means is provided with a pair of flexible pawls. A guide rib is fixed to the inner bottom surface of a cassette casing and between the pair of flexible pawls, the width of the guide rib being decreased toward the root of the pair of flexible pawls and a pair of guide pins are provided at the outside of the pair of flexible pawls.

4 Claims, 8 Drawing Figures

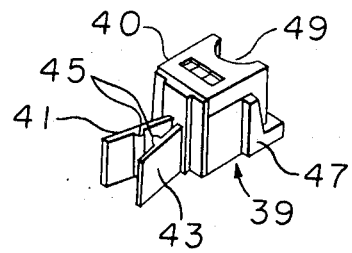
FIGURE 3
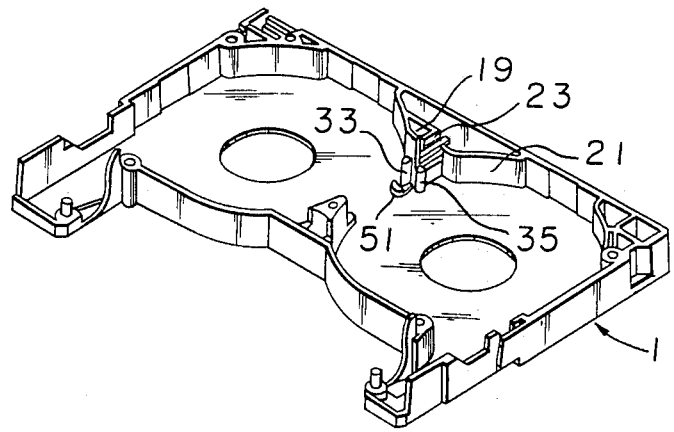
FIGURE 4
FIGURE 5
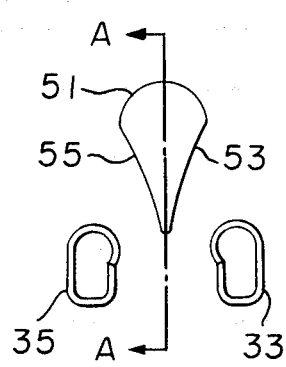
FIGURE 6
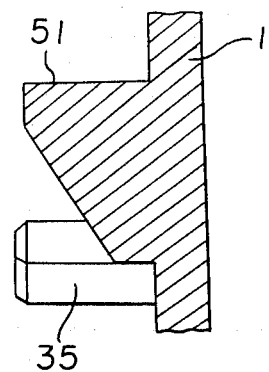

MAGNETIC TAPE CASSETTE

BACKGROUND OF THE INVENTION

1. Field of the Invention

The present invention relates to a magnetic tape cassette. Particularly, it relates to a magnetic tape cassette provided with a locking means for locking reels.

2. Description of Prior Art

There has so far been provided in a magnetic tape cassette, especially, in a video tape cassette a locking means for locking rotation of reels held in the tape cassette during non-use, for the purpose of preventing rewinding of the magnetic tape during preservation during non-use and transportation of the tape cassette.

FIG. 1 shows a conventional locking means. The construction of a magnetic tape cassette with the conventional locking means will be described with reference to FIG. 2, which shows an embodiment of the present invention, by assuming that the locking means according to the present invention is replaced by the conventional locking means as shown in FIG. 1. A pair of reels 5, 7 for a magnetic tape 3 are put in a magnetic tape cassette body which is constituted by an upper half casing (not shown) and a lower half casing. The shaft of each of the reels 5, 7 is loosely fitted to a pair of through holes 9, 11 formed in the lower half casing 1 respectively. Each of the shafts is adapted to be driven by each driving shaft extending upwardly from a magnetic tape recorder. The outer peripheral edges of the lower flanges 13, 15 of the reels 5, 7 are respectively provided with saw-teeth like notches 14, 16. In the central part of the back wall 17 of the lower half casing 1, there are formed a pair of guide pieces 19, 21 between which a guiding channel 23 is formed extending between the front and back of the magnetic tape cassette. In the guiding channel 23, a locking means 27 is fitted with its rear part being pushed forwardly by a spring 25 as shown in FIG. 1 so that when the magnetic tape cassette is mounted on the tape recorder, the locking means 27 is slidingly moved backward. A pair of flexible pawls 29, 31 having elasticity are fitted to or formed integrally with the front part of the locking means 27. The flexible pawls are adapted to be normally opened in the directions shown by arrow marks. The opening of the flexible pawls 29, 31 is restricted by means of a pair of pins 33, 35 provided in the front of the guiding channel 23 of the lower half casing 1. When the magnetic tape cassette is not mounted on the tape recorder, the spring 25 pushes the locking means 27 forwardly (namely, in the direction of arrow mark 37 in FIG. 1) to make the flexible pawls 29, 31 opened whereby the flexible pawls are engaged with the saw-teeth like notches 14, 16 of the lower flanges 13, 15 of the reels 5, 7. When the magnetic tape cassette is mounted on the tape recorder, the locking means is pushed backwardly (namely, in the direction opposite to the arrow mark 37 in FIG. 1) by an operating means extending from a through hole formed in the bottom surface of the locking means 27 in the lower half casing 1. Backward movement of the locking means releases engagement of the flexible pawls with the reels 5, 7 and the pins 33, 35 close the flexible pawls inwardly.

Magnetic tape cassettes are often left for a long time while they are mounted on tape recorders, on account of which there causes thermal deformation in the flexible pawls 29, 31 of the locking means in the closing state under application of stress. Accordingly, when the locking means is returned to the locking position, engagement of the flexible pawls with the reels may not be attained. In such case, a wound magnetic tape becomes loose and fitting operation of the magnetic tape to a tape running system of a tape recorder can not be performed smoothly.

SUMMARY OF THE INVENTION

It is an object of the present invention to provide a magnetic tape cassette which allows constant locking function for a long time by improving a locking means with respect to the reels.

The foregoing and the other objects of the present invention have been attained by providing a magnetic tape cassette comprising a locking means slidably placed between a locking position of engagement with a pair of reels held in the magnetic tape cassette and a releasing position with disengagement from the reels, in which the locking means is provided with a pair of flexible pawls. A guide rib is fixed to the inner bottom surface of a cassette casing and between the pair of flexible pawls, the width of the guide rib being decreased toward the root of the pair of flexible pawls. A pair of guide pins are provided at the outside of the pair of flexible pawls, whereby when the locking means is advanced to the locking position, the flexible pawls are forcibly opened by the guide rib to be engaged with the reels and when the locking means is retracted to the releasing position, the flexible pawls are forcibly closed by the guide pins.

In the preferred embodiment of the locking means according to the present invention, the guide rib is provided at both sides with tapered surfaces and the flexible pawls have elasticity, on account of which the flexible pawls of the locking means impart uniform function for locking and releasing of the reels by the aid of the tapered surfaces of the guide rib and pins.

BRIEF DESCRIPTION OF DRAWING

FIG. 3 is a perspective view of an embodiment of the locking means according to the present invention;

FIG. 4 is a perspective view of an embodiment of the lower half casing of the magnetic tape cassette of the present invention;

FIG. 5 is a an enlarged plan view of an important part in FIG. 4;

FIG. 6 is a cross-sectional view taken along the line A—A in FIG. 5;

DETAILED DESCRIPTION OF PREFERRED EMBODIMENT

An embodiment of the present invention will be described with reference to the drawings.

Figure 1:
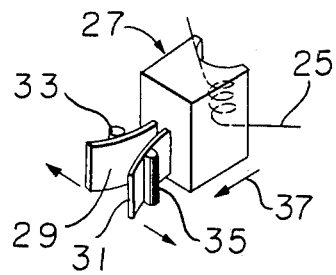
FIG. 1 is a perspective view of a conventional locking means.
Figure 2:
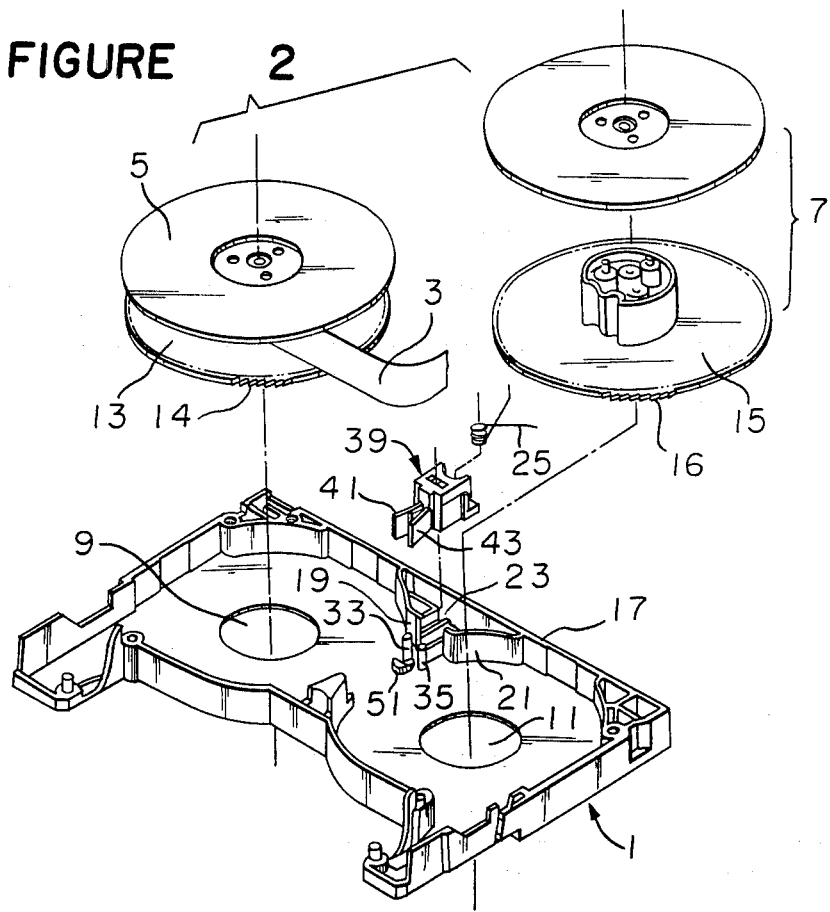
FIG. 2 is a perspective view in a disassembled state of an embodiment of the magnetic tape cassette according to the present invention.

FIG. 2 is a perspective view in a disassembled state of the magnetic tape cassette according to the present invention (the upper half casing is omitted). In the tape cassette of FIG. 2, the present invention is provides an improved locking means.

The saw-teeth like notches 14, 16 formed in the outer peripheral edges of the lower flanges 13, 15 of the reels 5, 7 are so designed as to block rotation of reels in the direction of feeding the magnetic tape but to allow rotation in the direction of winding of it, whereby looseness of the magnetic tape 3 is regulated by hand operation even in a locking state.

As shown in FIGS. 2 and 3, a locking means 39 is inserted in a guiding channel 23 formed at the central part of the back wall 17 of the lower half casing 1 so as to be slidable along the channel by the action of a spring 25 provided at the rear part of the locking means 39. The locking means 39 has a sliding member 40 and a pair of flexible pawls 41, 43 are fitted to the front surface of the sliding member 40 with their free ends being slightly opened. Preferably, the flexible pawls 41, 43 respectively have vertically extending raised portions 45 in their facing surfaces. Stoppers 47 are formed in the both side surfaces of the sliding member 40 to serve as detents for the forward movement of the locking means by contacting the guide members 19, 21 of the lower half casing. A recess 49 is formed in the rear surface of the sliding member 40 to receive the spring 25. Material for the flexible pawls 41, 43 can be selected from various kinds of material as far as the used material allows rotation of the reels in the direction of winding of the tape in a locking state by causing elastic deformation.

In FIGS. 2 and 4 to 6, a pair of guide pins 33, 35 are provided in the front of the guiding channel 23 for guiding the locking means in the lower half casing 1 and a guide rib 51 having tapered surfaces 53, 55 at both sides is fixed on the bottom surface of the lower half casing 1 in the front of and at the center of the pair of guide pins 33, 35. The flexible pawl 41 of the locking means 39 is located between the guide pin 33 and guide rib 51 and the flexible pawl 43 is located between the guide pin 35 and the guide rib 51 so that they perform a predetermined movement when the locking means 39 is advanced or retracted.

Figure 7:
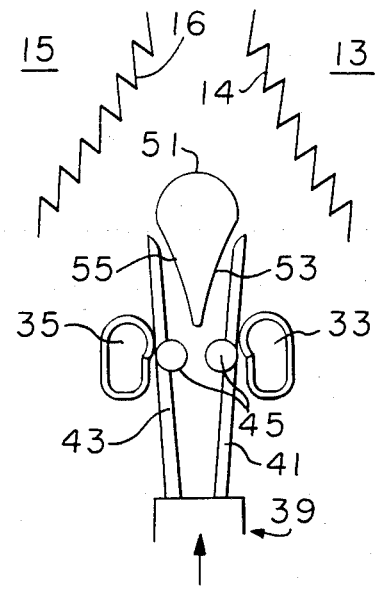
FIG. 7 is an enlarged plan view of the locking means at a releasing position according to the present invention.
Figure 8:
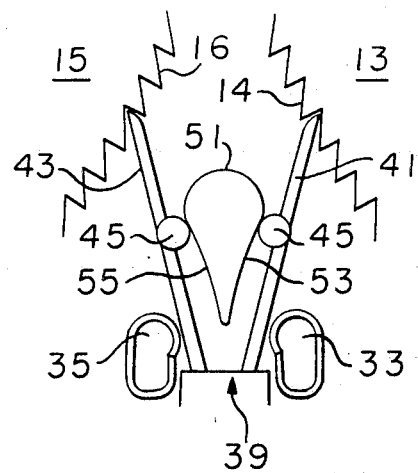
FIG. 8 is an enlarged plan view of the locking means at a locking position according to the present invention.

Description will be made as to relative arrangement and operations of elements of the locking means with reference to FIGS. 7 and 8. FIG. 7 shows a state of the locking means (a position where locking condition is released) when a magnetic tape cassette is mounted on a tape recorder and FIG. 8 shows a state of the locking means (a locking position) when the magnetic tape cassette is not mounted on the tape recorder.

As shown in FIG. 7, when the locking means 39 is in the releasing position, the flexible pawls 41, 43 are closed by being inwardly pushed by the guide pins 33, 35. When the magnetic tape cassette is removed from the tape recorder, the locking means 39 is moved forwardly to the locking position as shown in FIG. 8 by the action of the spring 25. Then, the flexible pawls 41, 43 are brought into contact with the tapered surfaces 53, 55 of the guide rib 51 fixed in the front of the locking means to be forcibly opened. Movement of opening of the flexible pawls 41, 43 can be smoothly performed by provision of raised portions 45 formed in the inner surfaces of the pawls 41, 43. The raised portions 45 slide on and along the tapered surfaces 53, 55 of the guide rib 51 to smoothly guide the flexible pawls 41, 43 whereby their top ends are engaged with the saw-teeth like notches 14, 16 formed in the outer peripheral edges of the lower flanges 13, 15.

When the magnetic tape cassette is mounted on the tape recorder, the locking means 39 is operated by an element of the tape recorder to be moved to the releasing position as shown in FIG. 7. At this moment, the flexible pawls 41, 43 are, on one hand, guided by the tapered surfaces 53, 55 of the guide rib 51 and are, on the other hand, pushed by the guide pins 33, 35 from outer sides to be closed.

Thus, opening and closing operations of the flexible pawls of the locking means are performed forcibly by the provision of the guide rib and the guide pins without depending substantially on the elasticity of the flexible pawls themselves. Accordingly, elasticity required for the locking function of the flexible pawls can be maintained even though the magnetic tape cassette is left on the tape recorder for a long time under a releasing condition. Accordingly, a stable locking-releasing function can be establish in the long term.

What is claimed is:

1. A magnetic tape cassette comprising a cassette casing and locking means slidable between a locking position of engagement with a pair of reels held in said magnetic tape casing and a releasing position of disengagement from said reels, wherein said locking means includes:
   a pair of flexible pawls;
   a guide rib fixed to the inner bottom surface of said cassette casing and between said pair of flexible pawls, the width of said guide rib being decreased toward the root of said pair of flexible pawls; and
   a pair of guide pins provided at the outside of said pair of flexible pawls,
   wherein when said locking means is advanced to said locking position, said flexible pawls are forcibly opened by said guide rib to be engaged with said reels and when said locking means is retracted to said releasing position, said flexible pawls are forcibly closed by said guide pins.

2. The magnetic tape cassette according to claim 1, wherein said guide rib has tapered surfaces on two sides thereof.

3. The magnetic tape cassette according to claim 1, wherein said locking means is provided with raised portions at positions in contact with said guide rib.

4. The magnetic tape cassette according to claim 3, wherein said raised portions are formed in opposing surfaces of said flexible pawls.

* * * * *